United States Patent [19]

Groves et al.

[11] Patent Number: 4,595,955

[45] Date of Patent: Jun. 17, 1986

[54] ELECTRO-OPTICAL TUBE ALIGNMENT AND BEAM CURRENT ADJUSTMENT

[76] Inventors: Philip R. Groves, 32, Lynch Hill Park, Whitchurch, Hampshire; Hugh K. Littlejohn, 19, Guenevere Close, King Arthur's Way, Andover, Hampshire, England

[21] Appl. No.: 530,983

[22] Filed: Sep. 9, 1983

[30] Foreign Application Priority Data

Sep. 9, 1982 [GB] United Kingdom ............... 8225702
Sep. 9, 1982 [GB] United Kingdom ............... 8225703

[51] Int. Cl.$^4$ ............................................. H04N 5/235
[52] U.S. Cl. ................................. 358/219; 358/217; 358/223; 315/383
[58] Field of Search ............... 358/219, 218, 217, 139, 358/223, 211; 315/383, 386, 371

[56] References Cited

U.S. PATENT DOCUMENTS

| | | | |
|---|---|---|---|
| 2,402,053 | 6/1946 | Kell | 358/211 |
| 3,716,657 | 2/1973 | Niemyer, Jr. | 358/211 |
| 4,331,980 | 5/1982 | Ryan | 358/219 |

*Primary Examiner*—Gene Z. Rubinson
*Assistant Examiner*—Stephen Brinich
*Attorney, Agent, or Firm*—Remy J. VanOphem

[57] ABSTRACT

Electro-optical tube alignment apparatus having a monitor for monitoring shading of the tube image, an adjustment device for adjusting tube target bias voltage so that shading is introduced into the image and is monitored by the monitor, and a control for varying tube alignment until a minimum average shading is monitored. Also beam current setting apparatus in which switch devices are provided to switch off the beam current during field scans so that the target charge during setting exceeds that produced by an operational peak light level. Methods associated with the apparatus are also provided.

17 Claims, 1 Drawing Figure

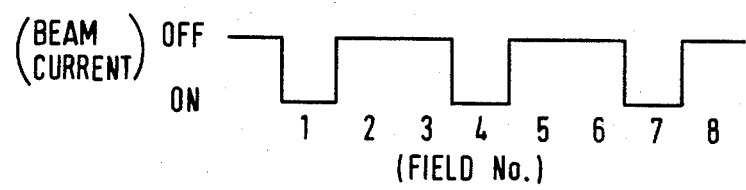

ELECTRO-OPTICAL TUBE ALIGNMENT AND BEAM CURRENT ADJUSTMENT

BACKGROUND OF THE INVENTION

1. Field of Invention

The present invention relates to a method and apparatus for correcting electron-beam alignment and to a method and apparatus for setting the beam current of a camera tube.

2. Description of Prior Art

In a camera tube incident radiation is used to determine the current received per picture element on the camera tube target from a scanning electron beam. The electron beam is generated by a gun assembly within the camera tube and is aligned with the focus field by magnetic fields produced by alignment coils. It is necessary for the alignment of the electron beam with the focus field to be optimized to minimize lateral energy components in the beam.

The conventional technique of camera tube alignment consists of causing the electron beam to rotate with respect to the center of the target. Misalignment is manifest by the electron beam missing the center of the target, as indicated by the camera tube image. Alignment corrections are effected so as to reduce the error. This technique is generally inconvenient and inefficient.

In a camera tube an electron beam is scanned across the camera tube target so as to discharge the target and thereby provide picture element signals. The camera tube target is charged by radiation focused by a camera lens onto the camera tube target. In order to insure that the camera tube target is always fully discharged it is necessary to insure that the beam current is sufficiently high to discharge the target under operational peak light levels. This cannot be achieved in practice by simply increasing the incident light to effect a setting due to problems with color temperature scaling.

It is known to set the beam current by subjecting the camera tube to the operational peak light level and by reducing the scan speed so that the target charges to a higher level than that which would result under normal operational conditions. The beam current is adjusted so as to fully discharge the target under the adjustment conditions whereby full discharge of the target during normal operational conditions is insured.

The provision of circuitry for varying the scanning speed and the general implementation of this known method is complex and inconvenient.

SUMMARY OF THE INVENTION

The present invention seeks to mitigate the above described disadvantages.

According to a first aspect of the present invention there is provided apparatus for correcting electron beam alignment including monitoring means for monitoring the shading of the tube image, adjustment means for decreasing the tube target bias voltage until a measurable shading is introduced in the tube image, as monitored by the monitoring means, and control means varying the tube alignment until the monitoring means monitors a minimum average shading.

According to a second aspect of the present invention there is provided a method of correcting electron beam alignment including the steps of reducing the tube target bias voltage so as to produce a measurable shading in the tube image and varying the tube alignment to determine minimum average tube image shading.

According to a third aspect of the present invention there is provided apparatus for setting the beam current of a camera tube including adjustment means for adjusting the beam current to discharge the target for a level of incident light higher than the operational peak light level and switching means for switching off the beam current during field scans so that the target charge exceeds that produced by the operational peak light value.

According to a fourth aspect of the present invention there is provided a method of setting the beam current of a camera tube utilizing adjusting beam current to discharge the target for a level of incident light higher than the operational peak light level by switching the beam off during field scans so that the target charge exceeds that produced by the operational peak light value.

Preferably, the beam is switched off for two consecutive field scans, whereby odd and even fields are alternately discharged.

BRIEF DESCRIPTION OF THE DRAWING

Embodiments of the present invention will now be described by way of example only and with reference to the single figure of the accompanying drawing which illustrates the sequence of switching the beam current on and off.

DESCRIPTION OF THE PREFERRED EMBODIMENT

It has been established that upon reducing the target bias voltage of a camera tube only high energy electron beams land on the target and this results in shading exhibited by the camera tube image. The present invention utilizes this fact in order to correct the alignment of the camera tube electron beam with the camera tube target.

Within a camera tube an electron beam is generated and impinges upon a camera tube target. The electron beam scans the target and picture element voltages are generated in accordance with radiation impinging upon the camera lens which is focused onto the target. Alignment of the electron beam with the focus field is controlled by magnetic fields produced by alignment coils.

In order to optimize alignment of the electron beam with the focus field, the target bias voltage is reduced so that only high energy electron beams land on the target. The reduction in bias voltage is such that a measurable shading is introduced into the camera tube image. The power supplied to the alignment coils is varied until a minimum average shading is obtained for all field points within the camera tube image. When this is achieved the camera tube alignment is considered to be at an optimum.

In establishing the minimum average shading it is permissible to vary the alignment in one of two mutually perpendicular directions, the X-Y directions, until a minimum difference in shading is obtained between, in this example, four picture elements, one from each of the corners of the image. The aligment is then varied in the other direction until the minimum difference in shading between the four corner picture elements is established. When both alignment directions have been adjusted in this manner it is considered that the shading is equivalent to a minimum average shading, When adjusting the camera tube alignment it may be necessary to compensate the camera tube scanning so that the sampling points remain within the sampling window. The required scanning compensation will often be equal and opposite to the correction applied to the alignment coils.

The above described operation is undertaken for each of the camera tubes present within a television camera.

Beam current adjustment will now be described.

In a camera tube it is necessary to set the beam current sufficiently high that the camera tube target is fully discharged at operational peak light levels. This is achieved by adjusting the beam current so as to discharge the target for a level of incident light which is at least twice the operational peak light level.

It is not practicable to provide an actual incident light which is at least twice as high as the operational peak light level and it is, therefore, necessary to emulate the effect of such an incident light. This is achieved by insuring that the charge built upon the camera tube target is at least twice that built up by the operational peak light level, assuming linearity between incident light level and target charge.

The present invention insures that the target charge is increased to the required level in a particularly simple and convenient method. The beam current is switched off during field scans so that the target charge exceeds that produced by the operational peak light level.

FIG. 1 illustrates the on and off condition of the beam current in relation to consecutive fields, identified by field numbers. The beam current is switched off for two consecutive field scans. This has the dual advantages that the charge on the target represents at least twice the operational peak light level and also insures that both odd and even numbered fields are discharged. If the beam current was switched on and off for alternate fields then only the odd or the even fields would be discharged and this could result in edge effects. Switching the beam current off for two consecutive field scans insures that the odd and even fields are discharged once every six fields.

Switching means for implementing the switching of the beam current greatly reduces, as compared with the prior art, the cost and complexity of circuitry which must be included in the camera tube in order to enable the beam current to be set.

We claim:

1. Apparatus for correcting electron beam alignment comprising monitoring means for monitoring the shading of an image produced by the tube, adjustment means for decreasing the tube target bias voltage so that a measurable shading is introduced on the tube image, as monitored by the monitoring means, and control means for varying the tube alignment until the monitoring means monitors a minimum average shading.

2. Apparatus as claimed in claim 1, wherein the monitoring means includes a detector for detecting the minimum difference in shading between picture elements from respective corners of the image, which minimum difference is considered to indicate the minimum average shading.

3. Apparatus as claimed in claim 2, wherein the control means and detector operate so that the alignment is varied in one of two mutually perpendicular directions until the minimum difference is detected and the alignment is then varied in the other direction until the minimum difference is again detected.

4. Apparatus as claimed in claim 1, including scanning compensation means for compensating the scanning of the camera tube during alignment correction.

5. A television camera including the apparatus of claim 1.

6. A method of correcting electron beam alignment comprising the steps of reducing the tube target bias voltage to produce a measurable shading in the tube image and varying the tube alignment to determine minimum average tube image shading, which is considered to indicate optimum tube alignment.

7. A method as claimed in claim 6, comprising the step of establishing the minimum difference in shading between picture elements from respective corners of the tube image, which condition is considered to indicate minimum average tube image shading.

8. A method as claimed in claim 7, comprising the steps of establishing the minimum difference in shading by varying alignment in one of two mutually perpendicular directions and subsequently determining minimum difference in shading by varying the alignment in the other direction.

9. A method as claimed in claim 6, including the step of compensating the camera tube scanning during alignment correction.

10. Apparatus for setting beam current of a camera tube which has a camera tube target having a target charge, comprising adjustment means for adjusting the beam current to discharge the camera tube target for a level of incident light higher than an operational peak light level and switching means for switching the beam off during setting so that the target charge during setting builds up to exceed that produced by the operational peak light level.

11. Apparatus as claimed in claim 10, wherein the camera tube is subjected to the operational peak light level and the switching means switches the beam off for two consecutive fields scans, whereby odd and even field are alternately discharged.

12. Apparatus as claimed in claim 10, wherein the switching means switches off the beam until the target charge exceeds twice that produced by the operational peak light level.

13. A camera tube including the apparatus of claim 10.

14. A television camera including a camera tube as claimed in claim 13.

15. A method of setting the beam current of a camera tube which has a camera tube target having a target charge, comprising adjusting the beam current to discharge the camera tube target for a level of incident light higher than the operational peak light level by switching the beam off during field scans so that the target charge during setting exceeds that produced by the operational peak light level.

16. A method as claimed in claim 15, comprising the steps of subjecting the camera tube to the operational peak light level and switching the beam off for two consecutive field scans.

17. A method as claimed in claim 15, including switching the beam off so that the target charge exceeds twice that produced by the operational peak light level.

* * * * *

UNITED STATES PATENT AND TRADEMARK OFFICE
CERTIFICATE OF CORRECTION

PATENT NO. : 4,595,955
DATED : June 17, 1986
INVENTOR(S) : Philip Rangecroft Groves and Hugh Kendal Littlejohn It is certified that error appears in the above-identified patent and that said Letters Patent is hereby corrected as shown below:

On the front page of the patent, between the Title and the

Inventors, insert ---- Assignee: Link Electronics, Limited,
Andover, Hampshire, England ----.

Signed and Sealed this

Fourteenth Day of October, 1986

[SEAL]

*Attest:*

DONALD J. QUIGG

*Attesting Officer*  *Commissioner of Patents and Trademarks*